United States Patent
Shimizu et al.

(10) Patent No.: US 10,144,839 B2
(45) Date of Patent: Dec. 4, 2018

(54) COLORED RESIN PARTICLE DISPERSION

(71) Applicant: RISO KAGAKU CORPORATION, Tokyo (JP)

(72) Inventors: Manami Shimizu, Ibaraki (JP); Yoshifumi Watanabe, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/685,713

(22) Filed: Aug. 24, 2017

(65) Prior Publication Data
US 2018/0086927 A1 Mar. 29, 2018

(30) Foreign Application Priority Data

Sep. 28, 2016 (JP) ................. 2016-189536

(51) Int. Cl.
C09D 11/326 (2014.01)
C09D 11/36 (2014.01)
C09D 11/107 (2014.01)
C09D 11/033 (2014.01)
C09D 11/037 (2014.01)
C09D 11/32 (2014.01)

(52) U.S. Cl.
CPC .......... *C09D 11/107* (2013.01); *C09D 11/033* (2013.01); *C09D 11/037* (2013.01); *C09D 11/32* (2013.01); *C09D 11/326* (2013.01); *C09D 11/36* (2013.01)

(58) Field of Classification Search
None
See application file for complete search history.

(56) References Cited

U.S. PATENT DOCUMENTS

| 2004/0006158 A1 | 1/2004 | Horie |
| 2015/0197648 A1 | 7/2015 | Watanabe et al. |
| 2015/0197650 A1 | 7/2015 | Watanabe et al. |
| 2015/0197666 A1 | 7/2015 | Shimizu et al. |

FOREIGN PATENT DOCUMENTS

| EP | 2896664 | 7/2015 |
| EP | 2896665 | 7/2015 |
| EP | 2896666 | 7/2015 |
| JP | 2005-255911 | 9/2005 |
| JP | 2007-197632 | 8/2007 |
| JP | 2014-019770 | 2/2014 |
| JP | 2015-134850 | 7/2015 |
| JP | 2015-134851 | 7/2015 |
| JP | 2015-134852 | 7/2015 |

OTHER PUBLICATIONS

Machine-generated English-language translation of JP-2005-255911 A (Year: 2005).*
Extended European Search Report, European Patent Application No. 17190186.1, dated Jan. 4, 2018 (5 pages).

* cited by examiner

Primary Examiner — Vu A Nguyen
(74) Attorney, Agent, or Firm — Hamre, Schumann, Mueller & Larson, P.C.

(57) ABSTRACT

A colored resin particle dispersion having improved fixation to the printed item immediately after printing and improved color development properties for the printed item, and an inkjet ink containing the colored resin particle dispersion. The colored resin particle dispersion contains colored resin particles, a basic dispersant, and a non-aqueous solvent, wherein the colored resin particles contain a colorant and a (meth)acrylic-based resin, and the (meth)acrylic-based resin has a unit A having a carboxyl group, a unit B having a phosphoric acid group and/or a phosphate ester group, and a unit C having an aromatic ring.

7 Claims, No Drawings

COLORED RESIN PARTICLE DISPERSION

CROSS REFERENCE TO RELATED APPLICATIONS

This Application is based upon and claims the benefit of priority from prior Japanese Patent Applications No. 2016-189536 filed on Sep. 28, 2016, the entire contents of which are incorporated by reference herein.

BACKGROUND OF THE INVENTION

Field of the Invention

Embodiments of the present invention relate to a colored resin particle dispersion and an inkjet ink containing the colored resin particle dispersion.

Description of the Related Art

Colorants for inks can be broadly classified into dyes and pigments. Using a dye offers the advantage of particularly favorable color development. Further, compared with pigments, dyes offer the advantage of superior abrasion resistance, and particularly superior rub fastness. However, dyes themselves exhibit inferior water resistance and marker resistance. On the other hand, pigments offer the advantages of high image density and excellent weather resistance, but exhibit inferior abrasion resistance, and particularly rub fastness, compared with dyes.

In light of these properties, a method has been proposed in which by encapsulating the colorant within a resin to form colored resin particles, an ink can be provided which exhibits excellent abrasion resistance, water resistance and marker resistance, while retaining the image-forming properties of the colorant. It is desirable that the resin has properties that impart the ink with abrasion resistance, water resistance and marker resistance.

Patent Document 1 and Patent Document 2 each propose the production of a polymer particle dispersion in which by using an organic solvent A and an organic solvent B having almost no compatibility with the organic solvent A, forming a dispersion composed of a dispersed phase containing the organic solvent B and a resin and a continuous phase containing the organic solvent A, and then removing the organic solvent B from the dispersion under reduced pressure or heating, a polymer particle dispersion is produced containing polymer particles dispersed in the organic solvent A.

In the examples described in JP 2007-197632 A (Patent Document 1) and JP 2005-255911 A (Patent Document 2), styrene-maleic acid copolymer resins are used.

However, in the above documents, no investigations were made of the abrasion resistance, water resistance or marker resistance of images printed onto paper or the like using printing inks prepared from these polymer particle dispersions.

JP 2014-019770 A (Patent Document 3) proposes colored resin particles prepared by dispersing a dispersion phase containing a non-aqueous solvent B, a dye, a resin and an acidic dispersant in a continuous phase containing a non-aqueous solvent A and a basic dispersant to prepare an oil-in-oil emulsion, and then removing the non-aqueous solvent B from the oil-in-oil emulsion.

In Patent Document 3, it is disclosed that by using a basic dispersant in the continuous phase and an acidic dispersant in the dispersed phase, the oil-in-oil emulsion can be prepared with excellent emulsion stability regardless of the type of resin used, meaning a colored resin particle dispersion can be provided that exhibits excellent water resistance, marker resistance and rub fastness.

Moreover, J P 2015-134852 A (Patent Document 4) proposes a colored resin particle dispersion containing colored resin particles, a basic dispersant and a non-aqueous solvent, wherein the colored resin particles contain a colorant, a solid resin and a liquid organic compound having an acidic group.

In Patent Document 4, examples given for the solid resin include nitrocellulose, methoxymethylated nylon, (meth) acrylic-based resins and styrene/(meth)acrylic-based resins.

JP 2015-134850 A (Patent Document 5) proposes a colored resin particle dispersion containing colored resin particles, a basic dispersant and a non-aqueous solvent, wherein the colored resin particles contain a colorant, a phosphorylated solid resin and/or a nitrated solid resin.

JP 2015-134851 A (Patent Document 6) proposes a colored resin particle dispersion containing colored resin particles, a basic dispersant and a non-aqueous solvent, wherein the colored resin particles contain a colorant, a resin having alkoxy groups and/or a polysilsesquioxane.

The examples of Patent Document 6 indicate that the rub fastness after standing for 10 seconds following printing is able to be particularly improved.

SUMMARY OF THE INVENTION

An object of an embodiment of the present invention is to provide a colored resin particle dispersion having improved fixation to the printed item immediately after printing and improved color development properties for the printed item.

Further, another object of the present invention is to provide a colored resin particle dispersion having favorable storage stability and excellent rub fastness, water resistance and marker resistance.

One embodiment of the present invention provides a colored resin particle dispersion containing colored resin particles, a basic dispersant and a non-aqueous solvent, wherein the colored resin particles contain a colorant and a (meth)acrylic-based resin, and the (meth)acrylic-based resin has a unit A having a carboxyl group, a unit B having a phosphoric acid group and/or a phosphate ester group, and a unit C having an aromatic ring.

DESCRIPTION OF THE EMBODIMENTS

The colored resin particle dispersion according to the present invention is described below using a series of embodiments.

Following formation of an image using an ink, the rub fastness of the image on the printed item can be problematic if the image is disturbed when the printed item surface is rubbed during handling of the printed item following printing.

In Patent Documents 3 to 6, attempts have been made to enhance the strength of the coating film formed by the resin by using various types of resins in the colored resin particles, thereby improving the rub fastness of the printed items.

On the other hand, inside many printing devices, a configuration is employed in which the printed item is transported by rollers from the time the ink is applied to the paper until the printed item reaches the discharge section, and in some cases the rollers make contact with the printed surface of the printed item. In such cases, ink from the printed surface of the printed item can sometimes adhere to the rollers. When a roller to which ink has adhered is used to transport the subsequent printed item, a problem arises in that ink may be transferred from the roller to the subsequent printed item, causing the so-called roller transfer contamination phenomenon.

In Patent Documents 3 to 5, the fixation of the ink to the printed item within a short period of time inside the printing device is not adequately investigated.

In Patent Document 6, although the rub fastness of the printed item after standing for a short period of 10 seconds following printing is improved, the effect on the color development properties is not adequately investigated.

When an ink is designed so that the solvent in the ink is able to penetrate rapidly into the interior of the printed item, thereby enhancing the drying properties of the printed item to improve the fixation immediately after printing, the colorant component tends to also penetrate more readily into the interior of the printed item together with the ink solvent, meaning the color development properties of the printed item sometimes deteriorate.

The colored resin particle dispersion according to one embodiment of the present invention contains colored resin particles, a basic dispersant and a non-aqueous solvent, wherein the colored resin particles contain a colorant and a (meth)acrylic-based resin, and the (meth)acrylic-based resin has a unit A having a carboxyl group, a unit B having a phosphoric acid group and/or a phosphate ester group, and a unit C having an aromatic ring.

As a result, a colored resin particle dispersion can be provided that exhibits improved fixation to the printed item immediately after printing and improved image density for the printed item.

Further, a colored resin particle dispersion can be provided that has favorable storage stability and excellent rub fastness, water resistance and marker resistance.

The colored resin particles preferably also contain a liquid organic compound having an acidic group.

The (meth)acrylic-based resin preferably has a weight-average molecular weight of 5,000 to 100,000, and preferably has an acid value within a range from 30 to 300 mgKOH/g.

Further, the present invention can also provide an inkjet ink containing the above colored resin particle dispersion.

In the present description, a "(meth)acrylic-based resin" means a resin having methacrylic units and/or acrylic units. Further, the term "(meth)acrylate" means methacrylate and/or acrylate.

In one embodiment, by either integrating the colorant with the resin or encapsulating the colorant within the resin in the colored resin particles, the strength of the coating film on the printed item can be improved, enabling the rub fastness of the printed item to be enhanced.

By forming the colored resin particles using a resin having good water resistance and/or marker resistance, the water resistance and/or marker resistance of the coating film on the printed item can be improved.

In one embodiment, by ensuring that the (meth)acrylic-based resin has a unit A having a carboxyl group, a unit B having a phosphoric acid group and/or a phosphate ester group, and a unit C having an aromatic ring, the fixation of the printed item immediately after printing can be improved, while enhancing the color development of the printed item. In particular, roller transfer contamination can be prevented.

Specifically, the action of separating the colored resin particles from the solvent on the printed item surface, thereby retaining the colored resin particles on the surface of the printed item, can be improved by introducing carboxyl groups into the resin. By retaining the colored resin particles on the surface of the printed item, the color development properties of the printed item can be enhanced, and the coating film can also be strengthened, thereby improving the fixation, and particularly the fixation immediately after printing.

Moreover, phosphoric acid groups and/or phosphate ester groups are also introduced into the resin, and these polyvalent acidic groups can further enhance the separation of the colored resin particles from the solvent.

By introducing carboxyl groups and phosphoric acid groups and/or phosphate ester groups into the resin, and also introducing aromatic rings, the affinity between the colorant and the resin can be improved, thereby preventing elution of the resin or the colorant from the ink or from the colored resin particles following printing, and ensuring that the releasability effect from the solvent can be favorably maintained.

Further, by introducing acidic carboxyl groups into the resin, the resulting interactions with the basic group of the basic dispersant can improve the stability of the dispersion, and particularly the storage stability at high temperature. Moreover, phosphoric acid groups and/or phosphate ester groups are also introduced into the resin, and the interactions of these polyvalent acidic groups with the basic group of the basic dispersant can further improve the stability of the dispersion.

Further, introducing aromatic rings into the resin enhances the affinity between the colorant and the resin, and can improve the stability of the dispersion, and particularly the storage stability at high temperature. Moreover, introducing aromatic rings into the resin also enables a reduction in the viscosity of the dispersion.

In one embodiment, by also including a unit D having an alkoxysilyl group in the (meth)acrylic-based resin, the fixation of the printed item immediately after printing can be further improved, and in particular, roller transfer contamination can be prevented.

Moreover, one embodiment is able to provide colored resin particles having a small particle size, and can also reduce the viscosity of the dispersion.

By using the colored resin particle dispersion according to one embodiment, an inkjet ink can be provided that has a small particle size suited to inkjet discharge and exhibits excellent intermittent dischargeability.

(Colored Resin Particles)

The colored resin particles of one embodiment contain a colorant and a (meth)acrylic-based resin.

Moreover, the colored resin particle may also contain a liquid organic compound having an acidic group (hereafter sometimes referred to as simply an "acidic compound").

In these colored resin particles, the colorant is preferably encapsulated within the resin to form spherical particles. Alternatively, the colorant and the resin are preferably mixed uniformly and integrated to form spherical colored resin particles.

(Meth)Acrylic-Based Resin

The (meth)acrylic-based resin is preferably a resin that is solid at room temperature (23° C.).

In order to ensure stability of the particle shape, the glass transition temperature (Tg) of the (meth)acrylic-based resin is preferably at least 30° C., and more preferably 40° C. or higher. The glass transition temperature of the (meth)acrylic-based resin is not particularly limited, but is preferably not higher than 150° C., and is more preferably 120° C. or lower.

Further, in order to ensure stability of the particle shape, the melting temperature (Tm) of the (meth)acrylic-based resin is preferably at least 30° C., and more preferably 40° C. or higher. The melting temperature of the (meth)acrylic-based resin is not particularly limited, but is preferably not higher than 250° C.

The weight-average molecular weight (Mw) of the (meth)acrylic-based resin is preferably within a range from 3,000 to 100,000, and is more preferably from 5,000 to 80,000. Within this range, the stability of the shape of the colored resin particles can be enhanced. Further, in the production process for the colored resin particles, the raw materials including the (meth)acrylic-based resin can be mixed more uniformly with the solvent, and as a result, colored resin particles in which the components are more uniformly dispersed can be provided.

The weight-average molecular weight of the resin can be determined by the GPC method, and is calculated relative to standard polystyrenes. This also applies below.

The acid value of the (meth)acrylic-based resin is preferably within a range from 30 to 300 mgKOH/g. Here, the acid value describes the number of milligrams of potassium hydroxide needed to neutralize all of the acidic components within 1 g of the non-volatile fraction. By ensuring the acid value satisfies this range, the resulting interaction with the basic group of the basic dispersant means a colored resin particle dispersion having a smaller particle size can be obtained, and therefore when the dispersion is used as an inkjet ink, the color development of the printed item can be enhanced, the coating film can be strengthened, and the fixation, and particularly the fixation immediately after printing, can be improved.

The (meth)acrylic-based resin preferably has a Hansen solubility parameter (HSP value) of 22 to 27 $MPa^{1/2}$. Further, the (meth)acrylic-based resin preferably has a dispersion parameter $\delta d$ of 13 to 20, a polar parameter $\delta p$ of 5 to 12, and a hydrogen bonding parameter $\delta h$ of 10 to 20. By ensuring these ranges are satisfied, the colored resin particles and the non-aqueous solvent can be separated rapidly when the colored resin particle dispersion is applied to a paper as an inkjet ink, thus enabling a greater improvement in the abrasion resistance.

The method used for calculating the solubility parameter is described below. In this embodiment, the three-dimensional solubility parameter proposed by Hansen in 1967 is used.

The Hansen solubility parameter divides the solubility parameter introduced by Hildebrand into 3 components, namely the dispersion parameter $\delta d$, the polar parameter $\delta p$, and the hydrogen bonding parameter $\delta h$, and is represented within a three-dimensional space. The dispersion parameter indicates the effects due to dispersive forces, the polar parameter indicates the effects due to dipolar intermolecular forces, and the hydrogen bonding parameter indicates the effects due to hydrogen bonding forces. A more detailed description is provided in "Polymer Handbook. Fourth Edition (Editors: J. Brandrup, E. H. Immergut, and E. A. Grulke)" or the like.

The (meth)acrylic-based resin according to one embodiment has a unit A having a carboxyl group, a unit B having a phosphoric acid group and/or a phosphate ester group, and a unit C having an aromatic ring.

The (meth)acrylic-based resin preferably also contains a unit D having an alkoxysilyl group.

The carboxyl group of the unit A is a group represented by —COOH. This carboxyl group may be a —COOH group bonded to the carbon chain of the main chain in the (meth)acrylic-based resin. In this case, the unit A is a unit derived from acrylic acid and/or methacrylic acid.

In another configuration, the unit A may be a unit in which a group represented by —COOR$^A$ is bonded to the carbon chain of the main chain, wherein R$^A$ is a group represented by —R$^{A1}$—COOH, in which R$^{A1}$ is an arbitrary divalent or higher group and a carboxyl group is provided at the terminal. The unit A may also have two or more terminal carboxyl groups.

In terms of the phosphoric acid group and/or phosphate ester group of the unit B, either one, or two or more, of these groups are preferably bonded to a carbon of the main chain, via either a single bond or a divalent or higher group, at the terminal of the unit B.

The phosphate ester group is a group in which either one or both of the two hydroxyl groups of a phosphoric acid group have been independently esterified. For example, groups in which a phosphoric acid group has been esterified with a fatty acid or the like having an alkyl group such as a methyl group, ethyl group or butyl group may be used.

One example of the unit B is a unit in which a group represented by —COOR$^B$ is bonded to the carbon chain of the main chain.

R$^B$ represents a phosphoric acid group or a phosphate ester group.

Further, R$^B$ may be a group represented by —R$^{B1}$—R$^{B2}$, wherein R$^{B1}$ is an arbitrary divalent or higher functional group, and a phosphoric acid group or a phosphate ester group is bonded to the terminal represented by R$^{B2}$. The unit B may have two or more terminal phosphoric acid groups or phosphate ester groups.

Examples of the aromatic ring in the unit C include a benzene ring, a naphthalene ring and an anthracene ring, and a benzene ring is preferred. These aromatic rings may be unsubstituted, or may have one or more substituents.

One example of the unit C is a unit in which a functional group represented by —COOR$^C$ is bonded to the carbon chain of the main chain.

R$^C$ represents a group having an aromatic ring.

Further, R$^C$ may be a group represented by —R$^{C1}$—R$^{C2}$, wherein R$^{C1}$ is an arbitrary divalent or higher functional group, and an aromatic ring is bonded to the terminal represented by R$^{C2}$. The unit C may have two or more terminal aromatic rings.

Moreover, examples of the alkoxysilyl group in the unit D include groups in which one, two or three alkoxy groups are bonded to a silicon atom. The alkoxy groups are preferably groups having a carbon number of 1 to 4, and specific examples include a methoxy group, ethoxy group, propoxy group and butoxy group. In those cases where the alkoxysilyl group has two or more alkoxy groups, the two or more alkoxy groups may be the same or different.

Specific examples of groups that can be used as the alkoxysilyl group include a trimethoxysilyl group, triethoxysilyl group, methyldimethoxysilyl group and methyldiethyoxysilyl group.

By incorporating the unit D having an alkoxysilyl group in the resin, resin crosslinking can be promoted, thereby enhancing the strength of the coating film formed using the colored resin particles.

One example of the unit D is a unit in which a functional group represented by —COOR$^D$ is bonded to the carbon chain of the main chain.

R$^D$ represents a group having an alkoxysilyl group.

Further, R$^D$ may be a group represented by —R$^{D1}$—R$^{D2}$, wherein R$^{D1}$ is an arbitrary divalent or higher functional group, and an alkoxysilyl group is bonded to the terminal represented by $R^{D2}$. The unit D may have two or more terminal alkoxysilyl groups.

The (meth)acrylic-based resin may also include a unit E having an alkyl group with a carbon number of 1 to 8. This unit E is preferably a unit in which a group represented by —$COOR^E$ is bonded to a carbon atom of the main chain of the (meth)acrylic-based resin, wherein $R^E$ is an alkyl group having a carbon number of 1 to 4. This enables the value of Tg to be set within an appropriate range.

Examples of the alkyl group having a carbon number of 1 to 8 in the unit E include a methyl group, ethyl group, butyl group and 2-ethylhexyl group.

The (meth)acrylic-based resin preferably contains a plurality of units of the unit A. This plurality of units of the unit A may be composed of one type of functional group selected from among the functional groups described above, or may be composed of two or more mutually different functional groups. The same also applies for the unit B, the unit C, the unit D and the unit E.

Of all the units of the (meth)acrylic-based resin, the unit A preferably represents 5 to 45% by mass, more preferably 10 to 30% by mass, and even more preferably 15 to 25% by mass.

Provided the amount of the unit A represents at least 5% by mass, the interaction with the basic group of the basic dispersant can improve the stability of the dispersion, and particularly the storage stability at high temperature. Further, the color development properties of the printed item can be enhanced, and the coating film can also be strengthened, thereby improving the fixation, and particularly the fixation immediately after printing.

By ensuring that the amount of the unit A is not more than 45% by mass, colored resin particles having a small particle size can be provided, and the viscosity of the dispersion can be reduced.

Of all the units of the (meth)acrylic-based resin, the unit B preferably represents 0.1 to 20% by mass, more preferably 1 to 10% by mass, and even more preferably 3 to 7% by mass.

Provided the amount of the unit B represents at least 1% by mass, the interaction of the polyvalent acidic group with the basic group of the basic dispersant can further improve the stability of the dispersion. Further, the polyvalent acidic group can also further enhance the separation of the resin from the solvent.

By ensuring that the amount of the unit B is not more than 10% by mass, colored resin particles having a small particle size can be provided, and the viscosity of the dispersion can be reduced.

Of all the units of the (meth)acrylic-based resin, the unit C preferably represents 5 to 50% by mass, and more preferably 10 to 40% by mass.

Provided the amount of the unit C represents at least 5% by mass, the affinity between the colorant and the resin can be enhanced, and the stability of the dispersion, and particularly the storage stability at high temperature, can be improved. Moreover, by introducing aromatic rings into the resin, the viscosity of the dispersion can be reduced.

By ensuring that the amount of the unit C is not more than 50% by mass, colored resin particles having a small particle size can be provided, and the viscosity of the dispersion can be reduced.

The unit D may be included in an amount of not more than 10% by mass relative to all the units of the (meth)acrylic-based resin, and this amount is preferably from 0.1 to 10% by mass, and more preferably from 1 to 5% by mass.

Provided the amount of the unit D is at least 0.1% by mass, the fixation of the printed item immediately after printing can be further improved, and in particular, roller transfer contamination can be prevented.

By ensuring that the amount of the unit D is not more than 10% by mass, colored resin particles having a small particle size can be provided, and the viscosity of the dispersion can be reduced.

The unit E may be included in an amount of not more than 90% by mass relative to all the units of the (meth)acrylic-based resin, and this amount is preferably from 20 to 80% by mass.

By adjusting the blend amount of the unit E, the value of Tg can be set within an appropriate range.

The (meth)acrylic-based resin can be produced by copolymerizing a monomer mixture containing the monomers described below.

Methacrylic acid, acrylic acid and alkyl (meth)acrylates having a carboxyl group; hereafter sometimes referred to as the "monomer A".

(Meth)acrylates having a phosphoric acid group and/or a phosphate ester group; hereafter sometimes referred to as the "monomer B".

(Meth)acrylates having an aromatic ring; hereafter sometimes referred to as the "monomer C".

(Meth)acrylates having an alkoxysilyl group; hereafter sometimes referred to as the "monomer D".

Examples of compounds that can be used as the monomer A include:
methacrylic acid, acrylic acid,
β-carboxyethyl (meth)acrylate,
2-methacryloyloxyethyl hexahydrophthalic acid (CAS No. 51252-88-1), and
4-[2-(methacryloyloxy)ethoxy]-4-oxo-2-butenoic acid (CAS No. 51978-15-5).

Examples of compounds that can be used as the monomer B include:
2-((meth)acryloyloxy)ethyl phosphate, 2-methacryloyloxyethyl acid phosphate, diphenyl-2-methacryloyloxyethyl phosphate, 10-methacryloyloxydecyl phosphate, and phosphoric acid 2-(polyalkylene glycol)$_n$(meth)acrylates.

Among phosphoric acid 2-(polyalkylene glycol)$_n$ (meth) acrylates, compounds in which the alkylene group has a carbon number of 1 to 3 are preferred, and n is preferably an integer of 1 to 10. Phosphoric acid 2-(polypropylene glycol)$_n$ (meth)acrylates in which n is from 1 to 6 are preferred.

Examples of the monomer C include benzyl (meth)acrylate, phenoxyethyl methacrylate, phenoxy polyethylene glycol (meth)acrylate, phenoxy polyethylene glycol/polypropylene glycol (meth)acrylate, nonylphenoxy polypropylene glycol acrylate, and nonylphenoxy polyethylene glycol/polypropylene glycol acrylate.

Examples of compounds that can be used as the monomer (D) include 3-(meth)acryloxyalkylene trialkoxysilanes and 3-(meth)acryloxyalkylene dialkoxysilanes.

Among the 3-(meth)acryloxyalkylene trialkoxysilanes, compounds in which the alkylene group has a carbon number of 1 to 4 are preferred, and the carbon number of each alkoxy group in the silane skeleton is preferably independently within a range from 1 to 4.

Among the 3-(meth)acryloxyalkylene dialkoxysilanes, compounds in which the alkylene group has a carbon number of 1 to 4 are preferred, and the carbon number of each alkoxy group in the silane skeleton is preferably independently within a range from 1 to 4.

Examples of preferred compounds include 3-methacryloxypropylmethyldimethoxysilane, 3-methacryloxypropyltrimethoxysilane, 3-methacryloxypropylmethyldiethoxysilane and 3-methacryloxypropyltriethoxysilane.

Moreover, a (meth)acrylate monomer having an alkyl group with a carbon number of 1 to 8 may also be included in the monomer mixture as a monomer E.

Examples of the monomer E include methyl (meth)acrylate (C1), ethyl (meth)acrylate (C2), butyl (meth)acrylate (C4), and 2-ethylhexyl (meth)acrylate (C8). The numerical values in parentheses indicate the carbon number of the alkyl group.

For each of the above monomers A to E, a single monomer may be used alone, or a combination of two or more monomers may be used.

In addition to the monomers A to E described above, other monomers may also be used, provided they do not impair the effects of the present invention. Examples of these other monomers include styrene-based monomers such as styrene and α-methylstyrene, vinyl ether-based monomers such as vinyl acetate, vinyl benzoate and butyl vinyl ether, as well as maleate esters, fumarate esters, acrylonitrile, methacrylonitrile and α-olefins.

In the production process for the main polymer chain, a monomer mixture containing the above monomers A, B and C is first prepared. The monomer mixture may also include other optional monomers such as the monomers D and E.

The amounts of the monomers A to E within the monomer mixture are adjusted so that the proportions of the units A to E within the (meth)acrylic polymer are as described above.

The monomer mixture can be polymerized by conventional radical polymerization. The reaction is preferably conducted as either a solution polymerization or a dispersion polymerization.

During the polymerization reaction, appropriate amounts of a polymerization initiator, chain transfer agent, polymerization inhibitor, polymerization promoter and/or dispersant or the like may be added to the reaction system to regulate the reaction rate.

Examples of polymerization initiators that may be used include thermal polymerization initiators, including azo compounds such as AIBN (azobisisobutyronitrile), 2,2'-azobis(2,4-dimethylvaleronitrile) and 2,2'-azobis(4-methoxy-2,4-dimethylvaleronitrile), and peroxides such as t-butyl peroxybenzoate and t-butylperoxy-2-ethylhexanoate (Perbutyl 0, manufactured by NOF Corporation). Alternatively, a photopolymerization initiator which generates radicals upon irradiation with an active energy beam may also be used.

Further, by also using a chain transfer agent in the reaction system, the molecular weight of the resulting (meth)acrylic-based resin can be adjusted. Examples of chain transfer agents that can be used favorably include thiols such as n-butyl mercaptan, lauryl mercaptan, stearyl mercaptan and cyclohexyl mercaptan.

There are no particular limitations on the polymerization solvent (reaction solvent) used in a solution polymerization, but the solvent is preferably capable of dispersing or dissolving the resin produced by the polymerization. The polymerization is preferably performed using a non-aqueous solvent that is capable of dissolving the resin. This means that in the emulsion production method described below, the obtained resin solution can be used as the dispersed phase when producing the colored resin particle dispersion.

The blend amount of the (meth)acrylic-based resin described above, relative to the total mass of the colored resin particles, is preferably at least 10% by mass, and more preferably 20% by mass or greater.

On the other hand, the blend amount of the (meth)acrylic-based resin described above, relative to the total mass of the colored resin particles, is preferably not more than 70% by mass, and more preferably 50% by mass or less.

The colored resin particles may also include other resins besides the aforementioned (meth)acrylic-based resin, provided the effects of the present invention are not impaired. As described below in relation to a method for producing the colored resin particle dispersion, examples of these other resins include pigment dispersants and additives and the like.

Colorant

The colored resin particles contain a colorant. A pigment, a dye, or a combination thereof may be used as the colorant.

For the pigment, organic pigments such as azo pigments, phthalocyanine pigments, polycyclic pigments and dye lake pigments, and inorganic pigments such as carbon blacks and metal oxides can be used. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The average particle size of the pigment is preferably not more than 300 nm, and more preferably 200 nm or less. This ensures that the dispersibility of the pigment within the dispersed phase can be maintained favorably, and also ensures that the particle size of the final colored resin particles is appropriate.

For the dye, any of the dyes typically used in this technical field can be used, and examples include basic dyes, acid dyes, direct dyes, soluble vat dyes, acid mordant dyes, mordant dyes, reactive dyes, vat dyes, sulfide dyes, metal complex dyes and salt-forming dyes. These dyes may be used individually, or a combination of a plurality of dyes may be used.

From the viewpoints of the coloring properties and the uniformity of the components, the colorant is preferably added in an amount of 0.1 to 50% by mass, and more preferably 10 to 50% by mass, relative to the total mass of the colored resin particles.

Acidic Compound

The colored resin particles may also contain a liquid organic compound having an acidic group (the acidic compound). Here, a liquid organic compound having an acidic group refers to an organic compound which is liquid at 23° C. and contains an acidic group.

By adding the acidic compound, the color development properties and the abrasion resistance of the printed item can be further improved. This is because the acidic compound enables the colorant and the solid resin to be blended more uniformly and stably.

Further, when a resin having a low acid value and superior water resistance is used as the resin, the abrasion resistance can sometimes deteriorate, but by adding an acidic compound together with this type of (meth)acrylic-based resin, the water resistance and the abrasion resistance can be improved.

Further, the acidic compound can also be added during the production process for the colored resin particle dispersion for the purpose of maintaining the stability of the oil-in-oil emulsion.

In order to ensure that the acidic compound maintains a liquid state at room temperature, the melting point of the acidic compound is preferably 23° C. or lower, and more preferably 15° C. or lower.

The Hansen solubility parameter (HSP value) of the acidic compound is preferably within a range from 22 to 27 MPa$^{1/2}$. Further, the acidic compound preferably has a dispersion parameter δd of 13 to 20, a polar parameter δp of 5 to 12, and a hydrogen bonding parameter δh of 10 to 20. By ensuring these ranges are satisfied, the components of the colored resin particles can be blended more uniformly, the particle shape can be stabilized and the stability over time can be improved, and the color development properties and the abrasion resistance can be further improved.

Examples of the acidic group of the acidic compound include a phosphoric acid group, carboxyl group, sulfonic acid group, phosphate ester group, sulfate ester group, nitrate ester group, phosphorous acid group, phosphonic acid group and sulfinic acid group. Any one of these groups, or a combination of two or more groups, may be included within each molecule. The acidic compound preferably has two or more acidic groups within a single molecule.

The acidic compound may be an oligomer, a polymer, or a low-molecular weight compound.

Examples of the oligomer or polymer include poly(meth)acrylic-based resins, polyester-based resins, polyvinyl-based resins and polyether-based resins and the like, which may be used individually or in combinations. Further, copolymers of the monomers or oligomers that constitute these resins may also be used.

The acidic group may be derived from a monomer that constitutes the oligomer or polymer, thereby introducing an acidic group bonded to the main chain or side chain of a structural unit. Examples include copolymers or the like of a (meth)acrylate ester and (meth)acrylic acid. In such cases, carboxyl groups are introduced in accordance with the proportion of (meth)acrylic acid used. Further examples include copolymers of a (meth)acrylate ester and an acid-phosphoxy-(meth)acrylate. In such cases, phosphoric acid groups are introduced.

Further, the acidic groups may be introduced by phosphorylation of an oligomer or polymer. In such cases, phosphoric acid groups are introduced in accordance with the positions and proportion of hydroxyl groups. When the oligomer or polymer has hydroxyl groups at both terminals, phosphoric acid groups are introduced at both terminals of the oligomer or polymer, meaning the acidic compound has a total of two phosphoric acid groups.

When the acidic compound is an oligomer or a polymer, the weight-average molecular weight is preferably from 500 to 10,000, and more preferably from 1,000 to 5,000.

Specific examples of the oligomer or polymer for the acidic compound include phosphate ester compounds, including polyoxyalkyl phosphate esters such as polyoxyethylene alkyl phosphate esters and polyoxyethylene polyoxypropylene phosphate esters, and polyether polyester phosphate esters; alkyl polyphosphonic acids; and carboxyl group-containing (meth)acrylic polymers. These compounds may be used individually, or a plurality of compounds may be combined.

Low-molecular weight compounds such as phosphate esters, sulfate esters, and 1-hydroxyethane-1,1-diphosphonic acid and the like may also be used as the acidic compound.

The acidic compound preferably has an acid value. The acid value of the acidic compound is preferably at least 30 mgKOH/g, more preferably 60 mgKOH/g or higher, and even more preferably 90 mgKOH/g or higher.

Here, the acid value describes the number of milligrams of potassium hydroxide needed to neutralize all of the acidic components within 1 g of the non-volatile fraction of the compound. This definition also applies below.

Among the various possibilities, liquid organic compounds having at least one of a phosphoric acid group, a phosphonic acid group, a phosphate ester group and a carboxyl group, and having an acid value of at least 30 mgKOH/g are preferred, and compounds having one or more phosphoric acid groups are particularly preferred. Further, acidic compounds having a phosphoric acid group at each terminal of the compound are particularly desirable.

Examples of commercially available products that can be used as the acidic compound include DISPERBYK 102, 110 and 111 (all product names) manufactured by BYK-Chemie Japan K.K., TEGO Dispers 655 manufactured by Tomoe Engineering Co., Ltd., Efka 6230 manufactured by Efka Chemicals B.V., PH-210 manufactured by Chelest Corporation, ARUFON UC3510 manufactured by Toagosei Co., Ltd., and CM294P manufactured by Unichemical Co., Ltd.

DISPERBYK 111 is a phosphate ester compound of a block copolymer of ethylene glycol and polycaprolactone, and has phosphoric acid groups at both terminals of the copolymer.

The acidic compound is preferably added in an amount of 0.1 to 50% by mass, and more preferably 20 to 40% by mass, relative to the total mass of the colored resin particles. This enables the uniformity and stability of the colored resin particle components to be maintained, while avoiding any effects on other raw materials.

Other optional components may also be added to the colored resin particles, provided they do not impair the effects of the present invention. Examples of these optional components include the various components added during the method for producing the colored resin particle dispersion described below.

A liquid organic compound having no acidic groups may be added to the colored resin particles as a plasticizer. Adding a plasticizer enables the various components of the colored resin particles to be blended more uniformly. Examples of compounds that can be used as the plasticizer include alcohols, esters, ethers, polyesters, polyethers and (meth)acrylic polymers.

The plasticizer is preferably added in an amount of 5 to 40% by mass relative to the total mass of the colored resin particles.

A pigment derivative may also be added to the colored resin particles. Examples of compounds that may be used as the pigment derivative include compounds in which a functional group such as a carboxyl group, sulfonic acid group, amino group, nitro group, acid amide group, carbonyl group, carbamoyl group, phthalimide group or sulfonyl group has been added to a pigment skeleton such as a phthalocyanine-based skeleton, azo-based skeleton, anthraquinone-based skeleton or quinacridone-based skeleton, as well as salts of these compounds.

The pigment derivative is preferably added in an amount of 0.25 to 10% by mass relative to the total mass of the colored resin particles.

The average particle size of the colored resin particles is preferably not more than about 10 µm, and is more preferably 5 µm or less, and even more preferably 1 µm or less. The average particle size of the colored resin particles may be adjusted appropriately in accordance with the type of recording medium used, and for example in order to improve the color development and fixation for printed items using coated paper, this average particle size is preferably about 100 to 300 nm, whereas from the viewpoint of inhibiting show-through on printed items using plain paper, the average particle size is preferably not more than 200 nm.

Here, the average particle size of the colored resin particles refers to the volume-based average particle size determined by a dynamic scattering method, and can be measured, for example, using a dynamic light scattering particle size distribution analyzer "LB-500" manufactured by Horiba, Ltd. This also applies below.

(Colored Resin Particle Dispersion)

The colored resin particle dispersion according to one embodiment contains a non-aqueous solvent and a basic dispersant in addition to the colored resin particles described above. The non-aqueous solvent and the basic dispersant are as described below in relation to the method for producing the colored resin particle dispersion. The non-aqueous solvent is preferably a solvent capable of dispersing the colored resin particles. The basic dispersant is added for the purpose of dispersing the colored resin particles in the non-aqueous solvent. Further, the basic dispersant is sometimes added to regulate the emulsion in the production process for the colored resin particles described below.

In the colored resin particle dispersion according to this embodiment, the amount of the colored resin particles relative to the total mass of the dispersion is preferably at least 1% by mass, more preferably 5% by mass or greater, and even more preferably 10% by mass or greater. This enables the dispersion to exhibit superior coloring properties as an ink, and also reduces the amount of solvent, thus enhancing the drying properties.

On the other hand, the amount of the colored resin particles relative to the total mass of the dispersion is preferably not more than 50% by mass, more preferably not more than 40% by mass, and even more preferably 30% by mass or less. This enables the dispersibility and storage stability to be enhanced.

(Method for Producing Colored Resin Particle Dispersion)

Examples of the method for producing the colored resin particle dispersion according to an embodiment of the present invention are described below. However, the colored resin particle dispersion according to one embodiment of the invention is not limited to dispersions produced using the following production methods.

Methods of producing the colored resin particle dispersion can be broadly classified into chemical methods and physicochemical methods. Examples of the chemical methods include interfacial polycondensation methods, interfacial reaction methods (in situ polymerization methods), and in-liquid cured coating methods (orifice methods). Examples of the physicochemical methods include in-liquid drying methods (in-water drying methods and in-oil drying methods), coacervation methods, and fusion dispersion cooling methods.

The colored resin particle dispersion according to one embodiment can be produced, for example, using one of the physicochemical methods mentioned above. In-liquid drying methods can be used favorably, and an in-oil drying method of an oil-in-oil emulsion can be used particularly favorably.

By using an in-oil drying method of an oil-in-oil emulsion, the materials described above can be used to prepare colored resin particles having a small average particle size and a narrow particle size distribution, and a colored resin particle dispersion having a low viscosity can be prepared. As a result, an ink that is particularly suited to inkjet discharge can be obtained, and an inkjet ink having excellent abrasion resistance can be obtained.

A colored resin particle dispersion produced prepared using an in-oil drying method of an oil-in-oil emulsion can be obtained using a phase containing at least the basic dispersant and a non-aqueous solvent as the continuous phase (hereafter the non-aqueous solvent of the continuous phase is sometimes referred to as "solvent A"), and a phase containing at least the colorant, the (meth)acrylic-based resin and the pigment derivative, and optionally containing the acidic compound and a non-aqueous solvent as the dispersed phase (hereafter the non-aqueous solvent of the dispersed phase is sometimes referred to as "solvent B"), by dispersing the dispersed phase in the continuous phase to prepare an oil-in-oil (O/O) emulsion, and then removing the solvent B of the dispersed phase from the emulsion.

In order to ensure stable production of the oil-in-oil emulsion, the solvent B preferably exhibits low solubility in the solvent A. Furthermore, in order to enable removal of the solvent B, the solvent B preferably has a lower boiling point than that of the solvent A.

In order to ensure stable production of the oil-in-oil emulsion, the basic dispersant preferably has a higher solubility in the solvent A than in the solvent B. Further, in order to stabilize the shape of the colored resin particles, each of the colorant, the (meth)acrylic-based resin, the pigment derivative and the acidic compound preferably has a higher solubility in the solvent B than in the solvent A.

Continuous Phase

The continuous phase contains the solvent A and the basic dispersant.

The solvent A may be selected appropriately from all manner of non-aqueous solvents, so as to satisfy the relationships described below with the solvent B and the (meth)acrylic-based resin.

Both non-polar organic solvents and polar organic solvents can be used as the non-aqueous solvent. These solvents may be used individually, or combinations of two or more solvents may be used. In one embodiment, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JX Nippon Oil & Energy Corporation); and Isopar G, Isopar H, Isopar L, Isopar M, Exxsol D40, Exxsol D60, Exxsol D80, Exxsol D95, Exxsol D110 and Exxsol D130 (all manufactured by TonenGeneral Sekiyu K.K.).

Examples of preferred aromatic hydrocarbon solvents include Grade Alkene L and Grade Alkene 200P (both manufactured by JX Nippon Oil & Energy Corporation), and Solvesso 100, Solvesso 150, Solvesso 200 and Solvesso 200ND (manufactured by TonenGeneral Sekiyu K.K.).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having a carbon number of at least 13, and preferably a carbon number of 16 to 30, within a single molecule, such as isononyl isononanoate, isodecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having a carbon number of at least 6, and preferably a carbon number of 12 to 20, within a single molecule, such as isomyristyl alcohol, isopalmityl alcohol, isostearyl alcohol, oleyl alcohol, isoeicosyl alcohol and decyltetradecanol; and higher fatty acid-based solvents having a carbon number of at least 12, and preferably a carbon number of 14 to 20, within a single molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or combinations of two or more solvents may be used provided they form a single phase. Further, other organic solvents may also be included, provided they are capable of forming a single phase with the non-aqueous solvent being used.

The solvent A preferably has a Hansen solubility parameter (HSP value) of 14 to 18 MPa$^{1/2}$. Further, the solvent A preferably has a dispersion parameter δd of 12 to 20, a polar parameter δp of 0 to 4, and a hydrogen bonding parameter δh of 0 to 4.

By ensuring that the solubility parameters of the solvent A satisfy the above ranges, and that the solubility parameters of the (meth)acrylic-based resin of the colored resin particles satisfy the ranges described above, the dispersion stability of the colored resin particles in the solvent A can be improved. Further, when printing is performed using the dispersion as an inkjet ink, separation of the colored resin particles and the non-aqueous solvent on the paper can be accelerated, thereby enhancing the fixation of the colored resin particles to the paper and improving the abrasion resistance. This type of fixation effect manifests particularly strongly when printing to relatively impermeable papers such as coated papers.

In the colored resin particle dispersion obtained following removal of the solvent B, the solvent A may simply be used, as is, as the non-aqueous solvent. Alternatively, a non-aqueous solvent may be added afterward to the dispersion.

In this case, the initial boiling point of the non-aqueous solvent of the final dispersion preferably satisfies the range described below. The initial boiling point of the non-aqueous solvent of the final dispersion is simply the initial boiling point of the single non-aqueous solvent in those cases where a single non-aqueous solvent is used, or is the initial boiling point of the solvent mixture in those cases where a mixed solvent containing two or more non-aqueous solvents mixed in an arbitrary ratio is used. The initial boiling point of a polar solvent can be determined in the same manner as that of a non-polar solvent.

The initial boiling point of the final non-aqueous solvent is preferably at least 100° C., more preferably at least 150° C., and even more preferably 200° C. or higher. Moreover, the initial boiling point of the non-aqueous solvent is preferably at least 250° C., and more preferably 300° C. or higher.

The basic dispersant is a dispersant having a basic group. The basic dispersant preferably has a higher solubility in the solvent A than in the solvent B.

The solubility of the basic dispersant in the solvent B at 23° C. is preferably not more than 3 g/100 g, and is more preferably 0.5 g/100 g or less. Further, the solubility of the basic dispersant in the solvent A at 23° C. is preferably at least 3 g/100 g, and more preferably 5 g/100 g or greater. It is even more preferable that the basic dispersant is selected so that, in the blend proportions used in the oil-in-oil emulsion, the basic dispersant dissolves essentially completely in the solvent A, and undergoes essentially no dissolution in the solvent B.

Examples of the basic group of the basic dispersant include an amino group, an amide group and a pyridyl group, and among these, an amino group is preferable. Further, other examples of the basic group of the basic dispersant include nitrogen-containing functional groups having a urethane linkage or the like. Furthermore, nitrogen-containing structural units such as a urethane linkage may be introduced into the basic dispersant.

Examples of the basic dispersant include modified polyurethanes, basic group-containing poly(meth)acrylates, basic group-containing polyesters, polyesteramines, quaternary ammonium salts, alkylamine salts such as stearylamine acetate, and fatty acid amine salts. These compounds may be used individually, or a combination of a plurality of compounds may be used. Further, amine-modified (meth)acrylic block polymers having a first block containing a unit having an alkyl group with a carbon number of 12 or higher and a second block containing a unit having an amino group may also be used.

Examples of commercially available basic dispersants include:

Solsperse 13940 (a polyester amine-based dispersant), 17000 and 18000 (fatty acid amine-based dispersants), and 11200, 22000, 24000 and 28000 (all product names), manufactured by The Lubrizol Corporation, DISPERBYK 116, 2096 and 2163 (all product names), manufactured by BYK-Chemie Japan K.K., ACETAMIN 24 and 86 (alkylamine salt-based dispersants) (both product names), manufactured by Kao Corporation, and DISPARLON KS-860 and KS-873N4 (high-molecular weight polyester amine salts) (both product names), manufactured by Kusumoto Chemicals, Ltd.

The basic dispersant preferably has a base value. The base value of the basic dispersant is preferably at least 1 mgKOH/g. This ensures that a fine and stable colored resin particle dispersion can be produced.

Here, the base value describes the number of milligrams of potassium hydroxide equivalent to the amount of hydrochloric acid needed to neutralize all of the basic components contained within 1 g of the non-volatile fraction of the compound. This definition also applies below.

From the viewpoints of the stability of the emulsion and the dispersibility of the colored resin particles, the amount of the basic dispersant within the continuous phase is preferably within a range from 0.1 to 15% by mass, and more preferably from 1 to 10% by mass, relative to the total mass of the continuous phase.

From the viewpoint of the dispersibility of the colored resin particles, the amount of the basic dispersant following removal of the solvent B is preferably from 0.1 to 20% by mass, and more preferably from 1 to 15% by mass, relative to the total mass of the dispersion.

Other optional components such as antioxidants, surface tension regulators and antifoaming agents may also be added to the continuous phase, provided they do not impair the effects of the present invention.

Dispersed Phase

The dispersed phase contains the solvent B, the colorant, the (meth)acrylic-based resin and the optional acidic compound.

The solubility of the solvent B in the aforementioned solvent A at 23° C. is preferably not more than 3 g/100 g, and the boiling point of the solvent B is preferably lower than that of the solvent A.

The solvent B is preferably a polar organic solvent, and is more preferably a lower alcohol-based solvent. Examples of this lower alcohol-based solvent include isopropyl alcohol, ethylene glycol, ethanol, methanol, propanol and butanol. Lower alcohol-based solvents having a carbon number of 4 or less are particularly preferable.

Other specific examples of the solvent B include acetone, methyl ethyl ketone, and ethyl acetate and the like. Moreover, the solvent B may be selected appropriately so as to satisfy specific relationships with the aforementioned solvent A, the basic dispersant and the resin.

These solvents may be used individually, or a plurality of solvents may be combined.

The solubility of the solvent B in the solvent A at 23° C. is preferably not more than 3 g/100 g, and is more preferably 1 g/100 g or less, and even more preferably 0.5 g/100 g or less. It is even more preferable that the solvent B is essentially insoluble in the solvent A.

The difference in the boiling points of the solvent B and the solvent A is preferably at least 10° C., more preferably 20° C. or greater, and even more preferably 50° C. or greater. In the case of a mixed solvent such as a petroleum-based hydrocarbon solvent, the initial boiling point is used as the boiling point.

Further, the boiling point of the solvent B is preferably not higher than 100° C., and is more preferably 90° C. or lower. On the other hand, there are no particular limitations on the lower limit for the boiling point of the solvent B, provided the solvent B is liquid within a range from −20 to 90° C.

The solvent B preferably has a Hansen solubility parameter (HSP value) of 18 to 30 MPa$^{1/2}$, and more preferably 20 to 30 MPa$^{1/2}$. Further, the solvent B preferably has a dispersion parameter δd of 14 to 17, a polar parameter δp of 5 to 15, and a hydrogen bonding parameter δh of 5 to 25, and more preferably has a dispersion parameter δd of 14 to 17, a polar parameter δp of 5 to 15, and a hydrogen bonding parameter δh of 15 to 25.

By ensuring that the solubility parameters of the solvent B satisfy the above ranges, the solubility in the solvent A can be kept low, and the solvent can be provided with the ability to dissolve both the colored resin particles and the (meth)acrylic-based resin. Provided the solubility parameters of the colored resin particles and the (meth)acrylic-based resin satisfy the ranges described above, they will dissolve in the solvent B but be insoluble in the solvent A, meaning good dispersion stability can be obtained.

Further, it is preferable that the solvent A is a hydrocarbon-based solvent and the solvent B is an alcohol-based solvent having a carbon number of 4 or less. Preferred examples of the hydrocarbon-based solvent include naphthene, paraffin, and isoparaffin and the like, whereas preferred examples of the alcohol-based solvent having a carbon number of 4 or less include methanol, ethanol, propanol and butanol, with methanol being particularly preferable.

As mentioned above, the colorant may be a pigment, a dye, or a combination thereof.

The colorant preferably has higher affinity with the solvent B than with the solvent A. When the colorant is a pigment, by dispersing the pigment in a stable manner within the dispersed phase, for example by including a pigment dispersant in the dispersed phase together with the pigment, the pigment can be prevented from migrating from the dispersed phase to the continuous phase when the dispersed phase and the continuous phase are mixed. When the pigment is a dye, it is preferable to use a dye that has higher solubility in the solvent B than in the solvent A.

The amount of the colorant in the dispersed phase, relative to the total mass of the dispersed phase, is preferably from 0.1 to 50% by mass, more preferably from 1 to 40% by mass, and even more preferably from 2 to 20% by mass. This enables the solubility or dispersibility of the colorant in the solvent B to be stabilized.

Following removal of the solvent B, the amount of the colorant, relative to the total mass of the dispersion, is preferably from 0.1 to 50% by mass, more preferably from 1 to 40% by mass, and even more preferably from 2 to 20% by mass. This ensures that the coloring of the colored resin particles is appropriate, and that the shape of the particles can be stabilized.

When a pigment is used as the colorant, in order to ensure stable dispersion of the pigment within the dispersed phase, namely within the solvent B, a pigment dispersant may also be included in the dispersed phase.

An anionic dispersant, cationic dispersant or nonionic dispersant may be used as the pigment dispersant, and the dispersant may be selected appropriately in accordance with the other components of the emulsion. Further, the pigment dispersant may use a high-molecular weight compound or a low-molecular weight compound (surfactant).

Examples of the pigment dispersant include hydroxyl group-containing carboxylate esters, salts of high-molecular weight polycarboxylic acids, naphthalenesulfonic acid formalin condensate salts, polyoxyethylene alkyl phosphate esters, salts of long-chain polyaminoamides and high-molecular weight acid esters, salts of long-chain polyaminoamides and polar acid esters, polyester polyamines, stearylamine acetate, high-molecular weight unsaturated acid esters, polyoxyethylene nonylphenyl ethers, high-molecular weight copolymers, modified polyurethanes, and modified polyacrylates.

These pigment dispersants may be used individually, or a plurality of dispersants may be combined.

The amount added of the pigment dispersant may be set as appropriate, but from the viewpoint of the pigment dispersibility, the mass ratio of the pigment dispersant relative to 1 part of the pigment is preferably about 0.05 to 2.0 parts, more preferably from 0.1 to 1.0 parts, and even more preferably from 0.2 to 0.6 parts.

The (meth)acrylic-based resin is preferably a resin that is solid at room temperature (23° C.). Details are as described above.

When the colored resin particles are produced via an oil-in-oil emulsion, it is preferable that this (meth)acrylic-based resin has a higher solubility in the solvent B than in the solvent A. Further, the solvent A and the solvent B may be selected appropriately so that the (meth)acrylic-based resin exhibits this type of solubility.

The solubility of the (meth)acrylic-based resin in the solvent B at 23° C. is preferably at least 10 g/100 g, and more preferably 20 g/100 g or greater. Further, the solubility of the (meth)acrylic-based resin in the solvent A at 23° C. is preferably not more than 3 g/100 g, more preferably 1 g/100 g or less, and even more preferably 0.5 g/100 g or less. It is even more desirable that, in the blend proportions used in the oil-in-oil emulsion, the (meth)acrylic-based resin dissolves essentially completely in the solvent B, and undergoes essentially no dissolution in the solvent A.

The amount of the (meth)acrylic-based resin relative to the total mass of the dispersed phase is preferably from 0.1 to 50% by mass, more preferably from 1 to 40% by mass, and even more preferably from 2 to 20% by mass. This ensures appropriate solubility of the (meth)acrylic-based resin within the solvent B, and enables a more even distribution of the components of the colored resin particles.

The amount of the (meth)acrylic-based resin relative to the total mass of the dispersion following removal of the solvent B is preferably from 0.1 to 20% by mass, and more preferably from 1 to 15% by mass. This ensures that the coloring of the colored resin particles is appropriate, and that the shape of the particles can be stabilized.

The mass ratio between the (meth)acrylic-based resin and the colorant preferably satisfies (mass of (meth)acrylic-based resin)/(mass of colorant)≥0.5. When this range is satisfied, mixing and stirring of the continuous phase and the dispersed phase is able to provide an oil-in-oil emulsion having excellent emulsion stability.

The acidic compound is a liquid organic compound having an acidic group. Details are as described above.

There are no particular limitations on the acidic compound, but the compound preferably has a higher solubility in the solvent B than in the solvent A. The solubility of the acidic compound in the solvent B at 23° C. is preferably at least 1 g/100 g, and more preferably 2 g/100 g or greater. Further, the solubility of the acidic compound in the solvent A at 23° C. is preferably not more than 3 g/100 g, more preferably 1 g/100 g or less, and even more preferably 0.5 g/100 g or less. It is even more preferable that, in the blend proportions used in the oil-in-oil emulsion, the acidic compound dissolves essentially completely in the solvent B, and undergoes essentially no dissolution in the solvent A.

The amount of the acidic compound relative to the total mass of the dispersed phase is preferably from 0.1 to 25% by mass, and more preferably from 1 to 20% by mass. This enables the emulsion to be better stabilized.

The amount of the acidic compound relative to the total mass of the dispersion following removal of the solvent B is preferably from 0.1 to 20% by mass, and more preferably from 1 to 15% by mass. This enables the abrasion resistance to be further enhanced.

The mass ratio between the acidic compound and the colorant preferably satisfies (mass of acidic compound)/(mass of colorant)≥0.5. When this range is satisfied, mixing and stirring of the continuous phase and the dispersed phase is able to provide an oil-in-oil emulsion having excellent emulsion stability.

Other optional components such as antifoaming agents, antioxidants, surface tension regulators, crosslinking agents, plasticizers and pigment derivatives may be added to the dispersed phase, provided they do not impair the effects of the present invention.

Method for Preparing Colored Resin Particles Dispersion

The method used for preparing the colored resin particle dispersion is not particularly limited, and the dispersion can be prepared by dispersing the dispersed phase described above in the continuous phase described above to prepare an oil-in-oil emulsion, and then removing the non-aqueous solvent B from the dispersed phase of the oil-in-oil emulsion.

For example, the continuous phase and the dispersed phase can be prepared by mixing the various components described above. Subsequently, the dispersed phase can be dispersed in the continuous phase by mixing and stirring the two phases while the dispersed phase is added dropwise to the continuous phase. At this time, the mixing and stirring can be performed using an ultrasonic homogenizer. The non-aqueous solvent B can then be removed from the obtained oil-in-oil emulsion under reduced pressure and/or heating. At this time, the degree of pressure reduction and/or heating is adjusted so that the non-aqueous solvent B is removed but the non-aqueous solvent A is retained.

Examples of the method used for dispersing the pigment in the dispersed phase include methods using typical wet dispersion devices such as a ball mill, a beads mill, ultrasound, a homomixer or a high-pressure homogenizer.

Further, the mass ratio between the continuous phase and the dispersed phase in the oil-in-oil emulsion can be adjusted within a range from 40:60 to 95:5. The amount added of the non-aqueous solvent B is preferably from 5 to 40% by mass, and more preferably from 5 to 30% by mass, relative to the total mass of the oil-in-oil emulsion. Further, the amount removed of the non-aqueous solvent B is preferably the total amount added of the non-aqueous solvent B, but any amount that is 90% by mass or more of the total amount added of the non-aqueous solvent B is acceptable.

In the colored resin particle dispersion, the average particle size of the colored resin particles is preferably the same as described above.

The average particle size of the colored resin particles can be controlled by adjusting the amount of the basic dispersant added to the continuous phase, or the amount of the non-volatile fraction included in the dispersed phase or the like. The average particle size of the colored resin particles can be kept to a smaller size by adding the acidic compound.

The dispersion prepared from the oil-in-oil dispersion described above can be used, as is, as the colored resin particle dispersion according to one embodiment of the invention, but if required, any of the various additives typically used in the technical field may be added to the dispersion following preparation, provided these additives do not impair the objects of the present invention. For example, nozzle blockage prevention agents, antioxidants, conductivity modifiers, viscosity modifiers, surface tension regulators, and oxygen absorbers and the like may be added as appropriate. There are no particular limitations on the types of these additives, and any additives used in the field can be used. Further, the obtained dispersion may be further diluted with a non-aqueous solvent described above to prepare the colored resin particle dispersion.

The colored resin particle dispersion according to one embodiment can be used favorably as an inkjet ink, and particularly as an oil-based inkjet ink.

The ideal range for the viscosity of the inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and even more preferably from 5 to 10 mPa·s.

There are no particular limitations on the printing method used with the inkjet ink, and any of various printing systems, including a piezo system, electrostatic system or thermal system may be used. In those cases where an inkjet recording device is used, the ink of one embodiment of the invention is preferably discharged from the inkjet head based on a digital signal, and the discharged ink droplets then adhered to the recording medium.

In one embodiment, there are no particular limitations on the recording medium, and examples of media that can be used include printing papers such as plain papers, coated papers and specialty papers, fabrics, inorganic sheets, films and OHP sheets, and adhesive sheets having one of the above media as the base material and having an adhesive layer provided on the rear surface. Among these, from the viewpoint of ink penetration, a printing paper such as a plain paper or coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like. Coated printing papers have smaller gaps on the paper surface than plain papers and coated papers designed for inkjets, and therefore penetration of the ink is slow, and the ink components are more readily retained on the surface of the paper. As a result, the ink according to one embodiment is suitable for improving the fixation to coated printing papers.

EXAMPLES

The present invention is described below in further detail using a series of examples, but the present invention is in no way limited by these examples. Unless specifically state otherwise, "%" refers to "% by mass".

<Synthesis of Resin Solutions>

The monomer formulations of resins a to o are shown in Table 1.

A 300 mL four-neck flask was charged with 115.1 g of methanol (manufactured by Wako Pure Chemical Industries, Ltd.), and the temperature was raised to 60° C. with constant stirring under a stream of nitrogen gas. Once the liquid temperature had stabilized at 60° C., 5.0 g of V-65 (azobis-2,4-dimethylisovaleronitrile, manufactured by Wako Pure Chemical Industries, Ltd.) was added. In a separate preparation, a mixed liquid was prepared by mixing each of the monomers in accordance with the formulation shown in Table 1 and then adding 25.0 g of methanol to the monomer mixture, and this mixed liquid was transferred to a dropping funnel. The mixed liquid was then added dropwise over a period of three hours from the dropping funnel to the flask. Following completion of the dropwise addition of the mixed liquid, the inside of the dropping funnel was washed with 11.3 g of methanol, and the wash liquid was also added dropwise to the flask. Two hours after, and then four hours after completion of the dropwise addition of the monomer mixed liquid, 0.33 g of V-70 (2,2'-azobis(4-methoxy-2,4-dimethylvaleronitrile), manufactured by Wako Pure Chemical Industries, Ltd.) and 3.5 g of methanol (manufactured by Wako Pure Chemical Industries, Ltd.) were added to the flask. Subsequently, the liquid temperature was maintained at 60° C. for two hours, and the reaction solution was then cooled to obtain a resin solution with a non-volatile fraction of 40%.

The weight-average molecular weight (Mw, GPC method, referenced against standard polystyrenes) of the obtained resin is shown in the table 1.

The acid value of the obtained resin was measured in accordance with JIS K 2501. The result is shown in the table 1.

TABLE 1

| Monomer formulations of (meth)acrylic-based resins | | | | | | | | |
|---|---|---|---|---|---|---|---|---|
| Units: g | a | b | c | d | e | f | g | h |
| Methacrylic acid | 20 | 0 | 20 | 20 | 5 | 45 | 20 | 20 |
| Acrylic acid | 0 | 20 | 0 | 0 | 0 | 0 | 0 | 0 |
| 2-(methacryloxy)ethyl phosphate | 5 | 5 | 1 | 10 | 1 | 1 | 5 | 5 |
| Phosphoric acid 2-(polypropylene glycol) methacrylate | 0 | 0 | 0 | 0 | 0 | 0 | 0 | 0 |
| Benzyl methacrylate | 30 | 30 | 30 | 5 | 50 | 30 | 30 | 30 |
| Benzyl acrylate | 0 | 0 | 0 | 0 | 0 | 0 | 0 | 0 |
| 3-methacryloxypropyltrimethoxysilane | 0 | 0 | 0 | 0 | 0 | 0 | 1 | 5 |
| 3-methacryloxypropyltriethoxysilane | 0 | 0 | 0 | 0 | 0 | 0 | 0 | 0 |
| Methyl methacrylate | 45 | 45 | 49 | 65 | 44 | 24 | 44 | 40 |

TABLE 1-continued

| Monomer formulations of (meth)acrylic-based resins | | | | | | | | |
|---|---|---|---|---|---|---|---|---|
| Total (monomer mixture, % by mass) | 100 | 100 | 100 | 100 | 100 | 100 | 100 | 100 |
| Resin acid value (mgKOH/g, solid) | 157 | 182 | 136 | 183 | 38 | 299 | 157 | 157 |
| Mw (weight-average molecular weight) | 28800 | 29600 | 28600 | 31400 | 28400 | 30400 | 32100 | 37400 |

| Units: g | i | j | k | l | m | n | o |
|---|---|---|---|---|---|---|---|
| Methacrylic acid | 20 | 20 | 20 | 20 | 20 | 20 | 20 |
| Acrylic acid | 0 | 0 | 0 | 0 | 0 | 0 | 0 |
| 2-(methacryloxy)ethyl phosphate | 0 | 0 | 5 | 0 | 1 | 0 | 0 |
| Phosphoric acid 2-(polypropylene glycol) methacrylate | 5 | 5 | 0 | 0 | 0 | 0 | 0 |
| Benzyl methacrylate | 30 | 0 | 30 | 0 | 0 | 30 | 0 |
| Benzyl acrylate | 0 | 30 | 0 | 0 | 0 | 0 | 0 |
| 3-methacryloxypropyltrimethoxysilane | 5 | 5 | 0 | 0 | 0 | 0 | 1 |
| 3-methacryloxypropyltriethoxysilane | 0 | 0 | 5 | 0 | 0 | 0 | 0 |
| Methyl methacrylate | 40 | 40 | 40 | 80 | 79 | 50 | 79 |
| Total (monomer mixture, % by mass) | 100 | 100 | 100 | 100 | 100 | 100 | 100 |
| Resin acid value (mgKOH/g, solid) | 142 | 142 | 157 | 130 | 136 | 130 | 130 |
| Mw (weight-average molecular weight) | 36300 | 33300 | 34100 | 27600 | 28200 | 30400 | 32400 |

<Ink Preparation>

Formulations of oil-in-oil emulsions for a series of examples and comparative examples prior to removal of the solvent B are shown in Table 2 to Table 4. In each table, when a component includes a volatile component, the total amount of the component is shown, and the non-volatile fraction amount is also shown in parentheses (this also applies in Tables 5 to 7 below).

The continuous phase was prepared by mixing the solvent A and the basic dispersant in the blend amounts shown in each table. Subsequently, the dispersed phase was prepared by mixing the colorant, the resin and the acidic compound with the solvent B in the blend amounts shown in each table, and then dispersing the resulting mixture using a beads mill.

With the continuous phase undergoing continuous stirring with a magnetic stirrer, a 10-minute irradiation with an ultrasonic homogenizer (Ultrasonic Processor VC-750, manufactured by Sonics & Materials, Inc.) was conducted while the premixed dispersed phase was added dropwise to the continuous phase, thus obtaining an oil-in-oil (O/O) emulsion. Ice cooling was performed during the ultrasonic irradiation.

The solvent B within the dispersed phase was then removed from the obtained emulsion under reduced pressure using an evaporator, thus obtaining a colored resin particle dispersion. The rate of removal of the solvent B was essentially 100% by mass. This colored resin particle dispersion was used as an ink with no further modification.

Formulations of the inks of the examples and the comparative examples following removal of the solvent B are shown in Table 5 to Table 7. In each case, the combined amount of the colored resin particle components (the pigment, the resin and the acidic compound) relative to the total mass of the ink was determined, and is also shown in the table.

TABLE 2

| Oil-in-oil emulsion formulations (before solvent B removal) | | | | | | | | |
|---|---|---|---|---|---|---|---|---|
| Units: % by mass | | | Example 1 | Example 2 | Example 3 | Example 4 | Example 5 | Example 6 |
| Continuous phase | Solvent A | Isopar M | 54.0 | 54.0 | 54.0 | 54.0 | 54.0 | 54.0 |
| | Basic dispersant | S17000 (non-volatile fraction 100%) | 5.5 | 5.5 | 5.5 | 5.5 | 5.5 | 5.5 |
| Dispersed phase | Solvent B | Methanol | 22.5 | 22.5 | 22.5 | 22.5 | 22.5 | 22.5 |
| | Pigment | Carbon black | 4.0 | 4.0 | 4.0 | 4.0 | 4.0 | 4.0 |
| | Acidic compound | BYK-111 (non-volatile fraction 95%) | 4.0 (3.8) | 4.0 (3.8) | 4.0 (3.8) | 4.0 (3.8) | 4.0 (3.8) | 4.0 (3.8) |
| | Resin | Resin type | a | b | c | d | e | f |
| | | Resin amount (non-volatile fraction 40%) | 10.0 (4.0) | 10.0 (4.0) | 10.0 (4.0) | 10.0 (4.0) | 10.0 (4.0) | 10.0 (4.0) |
| Total (% by mass) | | | 100.0 | 100.0 | 100.0 | 100.0 | 100.0 | 100.0 |

TABLE 3

| Oil-in-oil emulsion formulations (before solvent B removal) | | | | | | | | |
|---|---|---|---|---|---|---|---|---|
| Units: % by mass | | | Example 7 | Example 8 | Example 9 | Example 10 | Example 11 | Example 12 |
| Continuous phase | Solvent A | Isopar M | 54.0 | 54.0 | 54.0 | 54.0 | 54.0 | 58.0 |
| | Basic | S17000 | 5.5 | 5.5 | 5.5 | 5.5 | 5.5 | 5.5 |

TABLE 3-continued

Oil-in-oil emulsion formulations (before solvent B removal)

| | Units: % by mass | | Example 7 | Example 8 | Example 9 | Example 10 | Example 11 | Example 12 |
|---|---|---|---|---|---|---|---|---|
| | dispersant | (non-volatile fraction 100%) | | | | | | |
| Dispersed phase | Solvent B | Methanol | 22.5 | 22.5 | 22.5 | 22.5 | 22.5 | 22.5 |
| | Pigment | Carbon black | 4.0 | 4.0 | 4.0 | 4.0 | 4.0 | 4.0 |
| | Acidic compound | BYK-111 (non-volatile fraction 95%) | 4.0 (3.8) | 4.0 (3.8) | 4.0 (3.8) | 4.0 (3.8) | 4.0 (3.8) | 0.0 |
| | Resin | Resin type | g | h | i | j | k | a |
| | | Resin amount (non-volatile fraction 40%) | 10.0 (4.0) | 10.0 (4.0) | 10.0 (4.0) | 10.0 (4.0) | 10.0 (4.0) | 10.0 (4.0) |
| | Total (% by mass) | | 100.0 | 100.0 | 100.0 | 100.0 | 100.0 | 100.0 |

TABLE 4

Oil-in-oil emulsion formulations (before solvent B removal)

| | Units: % by mass | | Comparative Example 1 | Comparative Example 2 | Comparative Example 3 | Comparative Example 4 | Comparative Example 5 | Comparative Example 6 |
|---|---|---|---|---|---|---|---|---|
| Continuous phase | Solvent A | Isopar M | 54.0 | 54.0 | 54.0 | 54.0 | 54.0 | 54.0 |
| | Basic dispersant | S17000 (non-volatile fraction 100%) | 5.5 | 5.5 | 5.5 | 5.5 | 5.5 | 5.5 |
| Dispersed phase | Solvent B | Methanol | 22.5 | 22.5 | 22.5 | 22.5 | 28.5 | 28.5 |
| | Pigment | Carbon black | 4.0 | 4.0 | 4.0 | 4.0 | 4.0 | 4.0 |
| | Acidic compound | BYK-111 (non-volatile fraction 95%) | 4.0 (3.8) | 4.0 (3.8) | 4.0 (3.8) | 4.0 (3.8) | 4.0 (3.8) | 4.0 (3.8) |
| | Resin | Resin type | l | m | n | o | — | — |
| | | Resin amount (non-volatile fraction 40%) | 10.0 (4.0) | 10.0 (4.0) | 10.0 (4.0) | 10.0 (4.0) | — | — |
| | Comparative resin | ARUFON UC3920 (non-volatile fraction 100%) | — | — | — | — | 4.0 | — |
| | | SR13 (non-volatile fraction 100%) | — | — | — | — | — | 4.0 |
| | Total (% by mass) | | 100.0 | 100.0 | 100.0 | 100.0 | 100.0 | 100.0 |

TABLE 5

Ink formulations (after solvent B removal) and evaluation results

| | Units: % by mass | | Example 1 | Example 2 | Example 3 | Example 4 | Example 5 | Example 6 |
|---|---|---|---|---|---|---|---|---|
| Continuous phase | Solvent A | Isopar M | 75.5 | 75.5 | 75.5 | 75.5 | 75.5 | 75.5 |
| | Basic dispersant | S17000 (non-volatile fraction 100%) | 7.7 | 7.7 | 7.7 | 7.7 | 7.7 | 7.7 |
| Dispersed phase | Solvent B | Methanol | 0.0 | 0.0 | 0.0 | 0.0 | 0.0 | 0.0 |
| | Pigment | Carbon black | 5.6 | 5.6 | 5.6 | 5.6 | 5.6 | 5.6 |
| | Acidic compound | BYK-111 (non-volatile fraction 95%) | 5.6 (5.3) | 5.6 (5.3) | 5.6 (5.3) | 5.6 (5.3) | 5.6 (5.3) | 5.6 (5.3) |
| | Resin | Resin type | a | b | c | d | e | f |
| | | Resin amount (non-volatile fraction 40%) | 5.6 | 5.6 | 5.6 | 5.6 | 5.6 | 5.6 |
| | Total (% by mass) | | 100.0 | 100.0 | 100.0 | 100.0 | 100.0 | 100.0 |
| | Colored resin particles fraction (% by mass) | | 13.1 | 13.1 | 13.1 | 13.1 | 13.1 | 13.1 |

TABLE 5-continued

Ink formulations (after solvent B removal) and evaluation results

| | Units: % by mass | Example 1 | Example 2 | Example 3 | Example 4 | Example 5 | Example 6 |
|---|---|---|---|---|---|---|---|
| Evaluations | Average particle size (nm) | 122 | 152 | 138 | 155 | 112 | 162 |
| | Ink viscosity (mPa·s) | A | A | B | A | A | A |
| | Rub fastness after standing one day | A | A | A | A | B | A |
| | Storage stability at 70° C. | A | A | A | B | B | B |
| | Water resistance after standing one day | A | A | A | A | A | A |
| | Marker resistance after standing one day | A | A | A | A | A | A |
| | Color development (plain paper) | A | A | A | A | B | A |
| | Color development (coated paper) | A | A | A | A | A | A |
| | Roller transfer contamination (less than 5 seconds) | A | A | A | A | B | A |

TABLE 6

Ink formulations (after solvent B removal) and evaluation results

| | | Units: % by mass | Example 7 | Example 8 | Example 9 | Example 10 | Example 11 | Example 12 |
|---|---|---|---|---|---|---|---|---|
| Continuous phase | Solvent A | Isopar M | 75.5 | 75.5 | 75.5 | 75.5 | 75.5 | 81.1 |
| | Basic dispersant | S17000 (non-volatile fraction 100%) | 7.7 | 7.7 | 7.7 | 7.7 | 7.7 | 7.7 |
| Dispersed phase | Solvent B | Methanol | 0.0 | 0.0 | 0.0 | 0.0 | 0.0 | 0.0 |
| | Pigment | Carbon black | 5.6 | 5.6 | 5.6 | 5.60 | 5.60 | 5.6 |
| | Acidic compound | BYK-111 (non-volatile fraction 95%) | 5.6 (5.3) | 5.6 (5.3) | 5.6 (5.3) | 5.6 (5.3) | 5.6 (5.3) | 0.0 |
| | Resin | Resin type | g | h | i | j | k | a |
| | | Resin amount (non-volatile fraction 40%) | 5.6 | 5.6 | 5.6 | 5.6 | 5.6 | 5.6 |
| | Total (% by mass) | | 100.0 | 100.0 | 100.0 | 100.0 | 100.0 | 100.0 |
| | Colored resin particles fraction (% by mass) | | 13.1 | 13.1 | 13.1 | 13.1 | 13.1 | 7.8 |
| Evaluations | Average particle size (nm) | | 154 | 120 | 134 | 128 | 119 | 150 |
| | Ink viscosity (mPa·s) | | A | A | A | A | A | A |
| | Rub fastness after standing one day | | A | A | A | A | A | B |
| | Storage stability at 70° C. | | A | A | A | A | A | B |
| | Water resistance after standing one day | | A | A | A | A | A | A |
| | Marker resistance after standing one day | | A | A | A | A | A | A |
| | Color development (plain paper) | | A | A | A | A | A | A |
| | Color development (coated paper) | | A | A | A | A | A | A |
| | Roller transfer contamination (less than 5 seconds) | | AA | AA | AA | AA | AA | B |

TABLE 7

Ink formulations (after solvent B removal) and evaluation results

| | | Units: % by mass | Comparative Example 1 | Comparative Example 2 | Comparative Example 3 | Comparative Example 4 | Comparative Example 5 | Comparative Example 6 |
|---|---|---|---|---|---|---|---|---|
| Continuous phase | Solvent A | Isopar M | 75.5 | 75.5 | 75.0 | 75.5 | 75.5 | 75.5 |
| | Basic dispersant | S17000 (non-volatile fraction 100%) | 7.7 | 7.7 | 7.7 | 7.7 | 7.7 | 7.7 |

TABLE 7-continued

Ink formulations (after solvent B removal) and evaluation results

| | Units: % by mass | | Comparative Example 1 | Comparative Example 2 | Comparative Example 3 | Comparative Example 4 | Comparative Example 5 | Comparative Example 6 |
|---|---|---|---|---|---|---|---|---|
| Dispersed phase | Solvent B | Methanol | 0.0 | 0.0 | 0.0 | 0.0 | 0.0 | 0.0 |
| | Pigment | Carbon black | 5.6 | 5.6 | 5.6 | 5.6 | 5.6 | 5.6 |
| | Acidic compound | BYK-111 (non-volatile fraction 95%) | 5.6 (5.3) | 5.6 (5.3) | 5.6 (5.3) | 5.6 (5.3) | 5.6 (5.3) | 5.6 (5.3) |
| | Resin | Resin type | l | m | n | o | — | — |
| | | Resin amount (non-volatile fraction 40%) | 5.6 | 5.6 | 5.6 | 5.6 | | |
| | Comparative resin | ARUFON UC3920 (non-volatile fraction 100%) | — | — | — | — | 5.6 | — |
| | | SR13 (non-volatile fraction 100%) | — | — | — | — | — | 5.6 |
| | Total (% by mass) | | 100.0 | 100.0 | 100.0 | 100.0 | 100.0 | 100.0 |
| | Colored resin particles fraction (% by mass) | | 13.1 | 13.1 | 13.1 | 13.1 | 16.5 | 16.5 |
| Evaluations | Average particle size (nm) | | 248 | 187 | 160 | 220 | 140 | 200 |
| | Ink viscosity (mPa · s) | | D | C | B | D | C | C |
| | Rub fastness after standing one day | | C | C | B | C | B | B |
| | Storage stability at 70° C. | | C | C | B | C | B | B |
| | Water resistance after standing one day | | C | C | C | C | B | B |
| | Marker resistance after standing one day | | C | C | C | C | B | B |
| | Color development (plain paper) | | C | B | C | C | C | C |
| | Color development (coated paper) | | C | C | C | C | C | C |
| | Roller transfer contamination (less than 5 seconds) | | C | C | C | C | B | B |

The components shown in the tables are as described below.

(Continuous Phase)

Solvent A, Isopar M: an isoparaffin-based solvent "Isopar M", manufactured by TonenGeneral Sekiyu K.K., initial boiling point: 224° C., end point: 254° C.

Basic dispersant, S17000: "Solsperse 17000" manufactured by The Lubrizol Corporation, non-volatile fraction 100%, base value 2 mgKOH/g.

(Dispersed Phase)

Solvent B, methanol: an alcohol-based solvent having a carbon number of 1, manufactured by Wako Pure Chemical Industries, Ltd., boiling point: 64.7° C.

Carbon black: "MA-8" manufactured by Mitsubishi Chemical Corporation.

Acidic compound, BYK-111: a liquid organic compound having two phosphoric acid groups (a phosphate ester compound having phosphoric acid groups at both terminals of a copolymer), "DISPERBYK-111" manufactured by BYK-Chemie Japan K.K., acid value 129 mgKOH/g, non-volatile fraction 95.0%.

Comparative resin, ARUFON UC3920: an acrylic resin "ARUFON UC3920", manufactured by Toagosei Co., Ltd., acid value: 242 mgKOH/g, Mw: 20,400, non-volatile fraction: 100%.

Comparative resin, SR13: a polymethylsilsesquioxane (functional group: methyl group, terminal groups: silanol group, ethoxysilane group (ethoxy group)), "SR13" manufactured by Konishi Chemical Ind. Co., Ltd., Mw: 6,000.

The above Mw values represent weight-average molecular weights.

The solubility of the methanol of the solvent B in the Isopar M of the solvent A at 23° C. was 0.4 g/100 g. Further, the boiling point of methanol is 64.7° C., and the boiling point of Isopar M is about 222° C.

The basic dispersant Solsperse 17000 was dissolved in the solvent A in accordance with the continuous phase blend proportions shown in Table 1 to Table 3, whereas the solubility in the solvent B at 23° C. was less than 3 g/100 g.

The pigment was dissolved or dispersed in the solvent B in accordance with the dispersed phase blend proportions shown in Table 1 to Table 3, whereas the solubility in the solvent A at 23° C. was less than 3 g/100 g.

The resins were dissolved in the solvent B in accordance with the dispersed phase blend proportions shown in Table 1 to Table 3, whereas the solubility in the solvent A at 23° C. was less than 3 g/100 g, and the solubility in water at 23° C. was less than 3 g/100 g.

The acidic compound was dissolved in the solvent B in accordance with the dispersed phase blend proportions shown in Table 1 to Table 3, whereas the solubility in the solvent A at 23° C. was less than 3 g/100 g.

<Evaluations>

Using each of the inks described above, each of the following evaluations was performed. The results are shown in each of the tables.

(Average Particle Size of Colored Resin Particles)

For each of the inks described above, the average particle size of the colored resin particles dispersed in the ink was calculated from the scattered light intensity measured using a dynamic light scattering particle size distribution analyzer "LB-500" (manufactured by Horiba, Ltd.).

(Ink Viscosity)

The viscosity of the colored resin particle dispersion refers to the viscosity at 10 Pa when the shear stress was raised from 0 Pa at a rate of 0.1 Pa/s and at a temperature of 23° C. This viscosity was measured using a Rheometer AR-G2, manufactured by TA Instruments, Japan Inc. (cone angle: 2°, diameter 40 mm), and evaluated against the following criteria.

A: ink viscosity of less than 9 mPa·s
B: ink viscosity of at least 9 mPa·s but less than 13 mPa·s
C: ink viscosity of at least 13 mPa·s but less than 15 mPa·s
D: ink viscosity of 15 mPa·s or greater (Production of Printed Items)

Each of the inks described above was mounted in a line-type inkjet printer "Orphis-X9050" (manufactured by Riso Kagaku Corporation), and printed items were obtained by printing a solid image and a text-based image onto a coated paper "Aurora Coated Paper" (manufactured by Nippon Paper Industries Co., Ltd.) and a plain paper "Riso Paper Light" (manufactured by Riso Kagaku Corporation). The printing was performed at a resolution of 300×300 dpi, under discharge conditions including an ink volume per dot of 42 pl. The "Orphis X9050" is a system that uses a line-type inkjet head, wherein the paper is transported in a sub-scanning direction perpendicular to the main scanning direction (the direction along which the nozzles are aligned) while printing is conducted.

(Rub Fastness after Standing for One Day)

The printed item on the plain paper was left to stand for one day following printing, and the solid image portion of the printed item was then rubbed 5 times strongly with a finger. The state of the printed item was then inspected visually, and the rub fastness was evaluated against the following criteria.

A: separation of the image almost undetectable
B: slight separation of the image is noticeable, but of a level not problematic in actual use.
C: marked separation of the image, at a level problematic in actual use.

(Storage Stability at 70° C.)

Seven grams of the ink was placed in a glass bottle (volume: 10 mL), the bottle was sealed with a lid, and the bottle was stored in a thermostatic bath at 70° C. After two weeks storage, the ink was inspected visually for the presence of sediment, and the storage stability was evaluated against the following criteria.

A: no sediment
B: small amount of fluid sediment
C: sediment having no fluidity (Water Resistance after Standing for One Day)

The printed item on the plain paper was left to stand for 24 hours following printing, and 0.5 ml of water was then dripped onto the solid image portion of the printed item. The level of bleeding was observed visually, and the water resistance was evaluated against the following criteria.

A: no bleeding of the printed image portion.
B: minor bleeding of the printed image portion, but of a level not problematic in actual use.
C: bleeding of the printed image portion, at a level problematic in actual use.

(Marker Resistance after Standing for One Day)

The printed item on the plain paper was left to stand for 24 hours following printing, and lines were drawn across the text-based image portion of the printed item using a line marker pen "PM-L103Y" manufactured by Kokuyo Co., Ltd. The state of the printed item was then inspected visually, and the marker resistance was evaluated against the following criteria.

A: no soiling of the printed image portion, or very minor soiling around the periphery of the printed image portion.
B: some soiling around the periphery of the printed image portion, but of a level not problematic in actual use.
C: soiling around the periphery of the printed image portion, at a level problematic in actual use.

(Color Development)

For the printed items on the coated paper and the plain paper, each printed item was left to stand for 24 hours following printing, and the density of the coating film was then inspected visually. The color development was evaluated against the following criteria.

A: the image was uniform, and satisfactory density was obtained.
B: the image was uniform, but the density appeared thin.
C: the image was not uniform, and the density appeared thin.

(Roller Transfer Contamination)

A coating film (4 μm) was formed on the plain paper using a bar coater. Within 5 seconds of forming the coating film, the printed item was transported in such a manner that the printed image contacted an attached NBR rubber roller with a loading of 0.44 N/mm. The OD value of the surface of the rubber roller where the ink had been transferred from the printed item to the rubber roller was then measured using a spectrophotometer (x-rite exact, manufactured by Videojet X-Rite K.K.). Based on this OD value, the roller transfer contamination was evaluated against the following criteria.

AA: OD value of less than 0.05
A: OD value of at least 0.05 but less than 0.10
B: OD value of at least 0.10 but less than 0.12
C: OD value of 0.12 or greater As is evident from the tables shown above, the ink of each example exhibited favorable results for all the evaluations, and furthermore, the average particle size of the colored resin particles and the viscosity of the colored resin particle dispersion also fell within appropriate ranges.

In Examples 1 to 6, the resins a to f were used, with each resin containing each of the specified monomer components, and favorable results were obtained in each case.

In Example 5, the amount of units having a carboxyl group was small at 5% by mass, and the amount of units having a benzyl group was large at 50% by mass, but although the color development on plain paper deteriorated slightly and the roller transfer contamination increased, the results were still satisfactory.

In Examples 7 to 11, the resins g to k were used, with each resin containing a monomer having an alkoxysilyl group in addition to each of the specified monomer components, and favorable results were obtained. In these examples, the roller transfer contamination was able to be significantly improved.

In Example 12, the resin a was used, and with the exception of not including the acidic compound, the formulation was the same as that of Example 1. In Example 12, although the rub fastness and the storage stability deteriorated and the roller transfer contamination increased compared with Example 1, the results were still satisfactory.

Comparative Examples 1 to 4 used the resins l to o.

The resin 1 of Comparative Example 1 had carboxyl groups but lacked phosphoric acid groups, benzyl groups and alkoxysilyl groups, and satisfactory results could not be obtained.

The resin m of Comparative Example 2 had carboxyl groups and phosphoric acid groups, but lacked benzyl groups and alkoxysilyl groups, and satisfactory results could not be obtained.

The resin n of Comparative Example 3 had carboxyl groups and benzyl groups, but lacked phosphoric acid groups and alkoxysilyl groups, and satisfactory results could not be obtained.

The resin o of Comparative Example 4 had carboxyl groups and alkoxysilyl groups, but lacked phosphoric acid groups and benzyl groups, and satisfactory results could not be obtained.

In Comparative Example 5, the comparative resin ARUFON UC3920 was used, and in Comparative Example 6, the comparative resin SR13 was used. In Comparative Examples 5 and 6, roller transfer contamination was able to be prevented to some extent, but the color development was unsatisfactory. Further, the ink viscosity was high in Comparative Examples 5 and 6.

The ARUFON UC3920 used in Comparative Example 5 contains acrylic and styrene structures, but lacks phosphoric acid groups or phosphate ester groups.

The SR13 used in Comparative Example 6 lacks carboxyl groups, phosphoric acid groups, phosphate ester groups and aromatic rings.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A colored resin particle dispersion comprising colored resin particles, a basic dispersant, and a non-aqueous solvent, wherein
   the colored resin particles comprise a colorant and a (meth)acrylic-based resin, and
   the (meth)acrylic-based resin has:
   a unit A having a carboxyl group,
   a unit B having a phosphoric acid group and/or a phosphate ester group, and
   a unit C having an aromatic ring.

2. The colored resin particle dispersion according to claim 1, wherein the colored resin particles further comprise a liquid organic compound having an acidic group.

3. The colored resin particle dispersion according to claim 1, wherein the (meth)acrylic-based resin has a weight-average molecular weight within a range from 5,000 to 100,000 and an acid value within a range from 30 to 300 mgKOH/g.

4. The colored resin particle dispersion according to claim 1, wherein relative to all the units that constitute the (meth)acrylic-based resin,
   the unit A having a carboxyl group represents 5 to 45% by mass,
   the unit B having a phosphoric acid group and/or a phosphate ester group represents 1 to 10% by mass, and
   unit C having an aromatic ring represents 5 to 50% by mass.

5. The colored resin particle dispersion according to claim 1, wherein the (meth)acrylic-based resin further comprises a unit D having an alkoxysilyl group.

6. The colored resin particle dispersion according to claim 5, wherein the (meth)acrylic-based resin further comprises a unit D having an alkoxysilyl group in an amount of 0.1 to 10% by mass relative to all the units that constitute the (meth)acrylic-based resin.

7. An inkjet ink comprising the colored resin particle dispersion according to claim 1.

* * * * *